United States Patent [19]

Parshall

[11] 4,312,764
[45] Jan. 26, 1982

[54] FILTRATION SYSTEM WITH BI-FLOW FILTER

[75] Inventor: David G. Parshall, Northville, Mich.

[73] Assignee: AMSTED Industries Incorporated, Chicago, Ill.

[21] Appl. No.: 186,133

[22] Filed: Sep. 11, 1980

[51] Int. Cl.³ .............................................. B01D 41/02
[52] U.S. Cl. .................................... 210/790; 210/793; 210/189; 210/279
[58] Field of Search ........................ 210/790, 792–796, 210/189, 269, 275–279, 286, 439

[56] References Cited

U.S. PATENT DOCUMENTS

| | | | |
|---|---|---|---|
| 2,538,340 | 1/1951 | Tomek et al. | 210/792 |
| 3,276,585 | 10/1966 | Kalinske | 210/795 |
| 3,550,774 | 12/1970 | Hirs et al. | 210/189 |
| 3,680,701 | 8/1972 | Holca | 210/790 |
| 3,814,245 | 6/1974 | Hirs | 210/279 |

*Primary Examiner*—Ivars C. Cintins
*Attorney, Agent, or Firm*—John L. Schmitt; Fred P. Kostka; Edward J. Brosius

[57] ABSTRACT

A filtration system includes a deep-bed type filter to receive an inflow of a waste water when the system is in a filtration mode. A distribution plenum within the filter distributes the waste water to an upper and lower portion of the filter bed. As the waste water flows to conduits centrally located within the bed, particulate in the waste water is entrapped by filter media comprising the bed. The waste water is discharged from the system in a clarified condition. Periodically the system is placed in a rejuvenation mode wherein a series of circuits are used to remove the entrapped particulate from the filter bed so that the system may again be returned to its filtration mode to process additional waste water.

8 Claims, 4 Drawing Figures

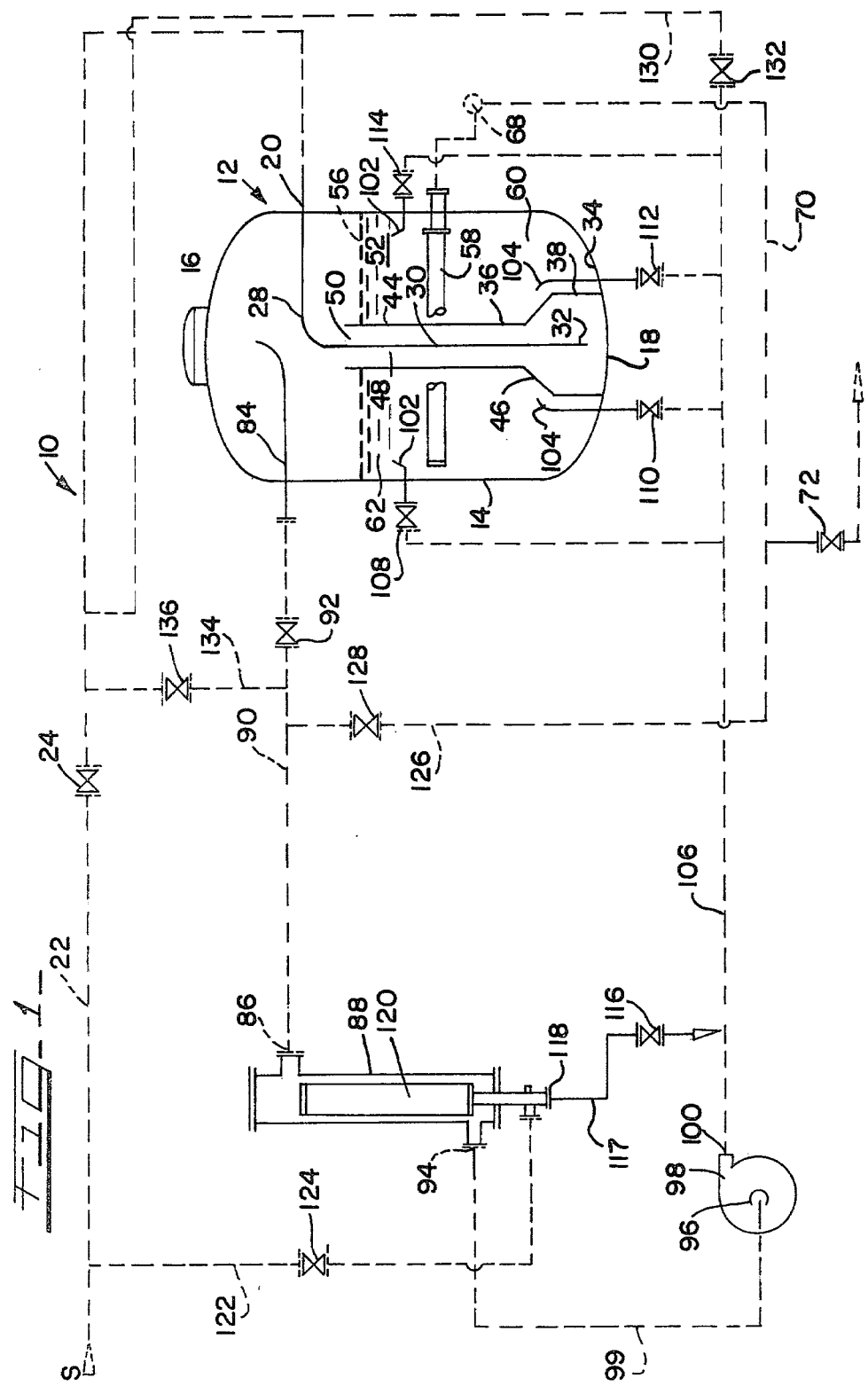

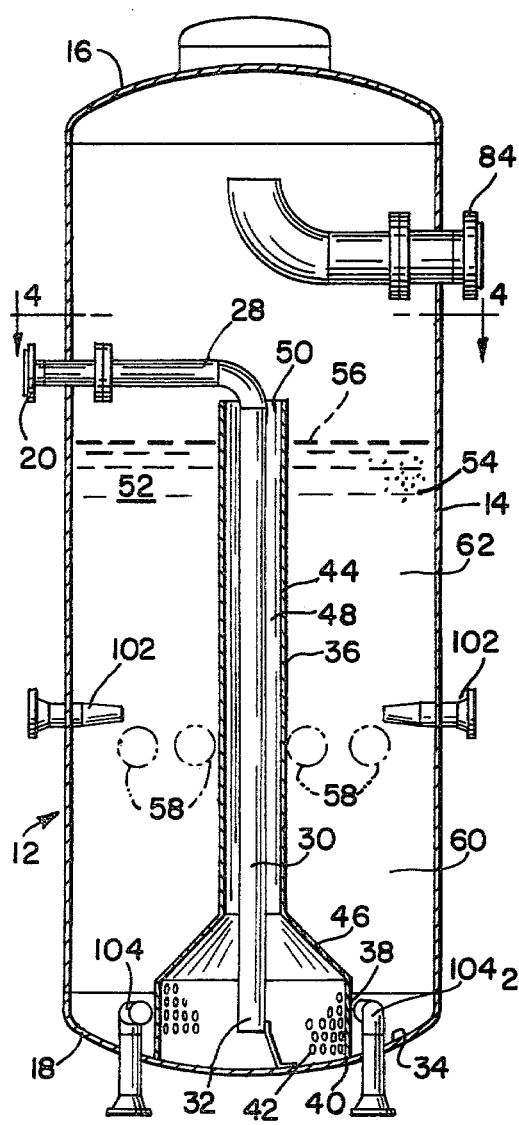
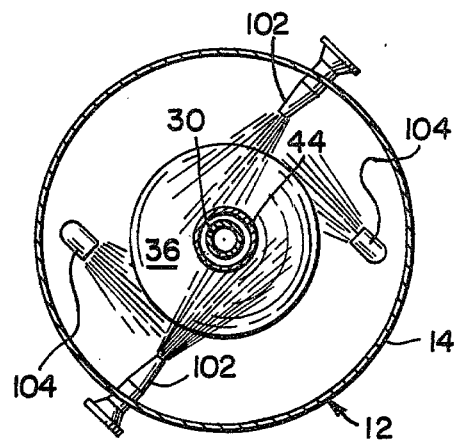
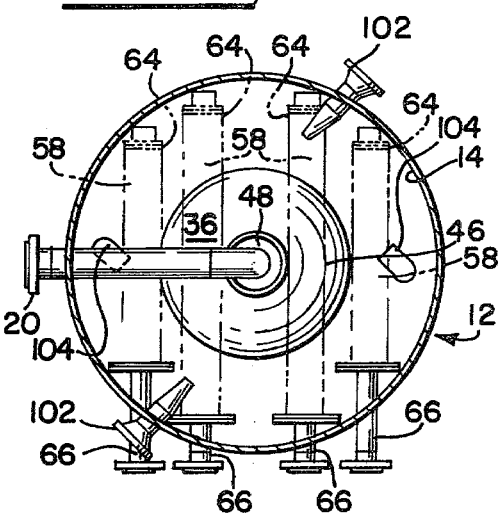

FILTRATION SYSTEM WITH BI-FLOW FILTER

BACKGROUND OF THE INVENTION

1. Field of the Invention

This invention relates to filtration systems. More particularly, this invention relates to a system which includes a deep-bed type filter wherein the bed receives a bi-directional input to separate, for example, particulate from a waste water with the bed being periodically rejuvenated to remove the entrapped particulate.

2. Prior Art

Filtration systems wherein a deep-bed type filter is used to separate foreign matter from a liquid flow are well known. Granular filter media comprising the filter bed entraps the foreign matter so that the liquid flows from the system free of the foreign matter.

Such systems can only be operated on a batch basis since the filter bed must be periodically rejuvenated to remove the entrapped foreign matter. Filter bed rejuvenation may be accomplished "in situ" or by use of a scrubber circuit as disclosed in U.S. Pat. No. 3,550,774.

SUMMARY OF THE INVENTION

A filtration system in its filtration mode receives an inflow of waste water containing a particulate, for example. The system includes a deep-bed type filter which the flow enters through an upper inlet. The inlet connects with a lower discharge point located within a distribution plenum within the filter. Surrounding the plenum is the filter bed comprising a filter media. The plenum divides the flow into portions so that filter media receives the inflow at a top and bottom point within the bed. This flow is substantially equally distributed across the entire cross-sectional area of the upper and lower bed portions. The two portions flow downwardly and upwardly within the bed which entraps the particulate so that the water is discharged from the filter through centrally located conduits in a cleaned, particulate-free condition.

As the amount of particulate entrapped by the filter bed increases, the amount of pressure required to produce the flow through the bed may increase accordingly. Alternatively, when the filter bed becomes saturated with particulate a bleed-through may occur resulting in an unclarified discharge. In either case, filtering is halted and the filtration system adapted to its rejuvenation mode.

This rejuvenation mode incorporates four separate circuits. The first circuit is used to clean the filter media by separating the entrapped particulate and placing such in suspension in a circulating slurry. The filter includes sets of agitating nozzles to enhance this separation. With the second circuit the particulate is backwashed from the system through a cleaning receptacle. Filter bed reformation and purging is accomplished with a third circuit while a fourth circuit is used to purge the cleaning receptacle. With this accomplished, the system may be returned to its filtration mode to process additional waste water.

This filtration system has several advantages over known systems.

First, by dividing the flow within the filter into a downwardly flowing portion and an upwardly flowing portion, the amount of particulate which the filter bed may entrap is almost doubled. This substantial increase in the capacity of the filter bed is a result of its increased surface area. Depending on the nature of the particulate, the capacity of a filter bed is measured by flow rate per square foot of filter media. A filter bed must be sized so that this flow rate per square foot and the depth of the bed is such that the particulate is entrapped for a reasonable time period before the bed becomes sufficiently saturated to require rejuvenation. Because the depth of the bed is substantially fixed, the surface area becomes a determinant of the capacity of the bed. Thus, by increasing the surface area of the bed, the capacity of the bed is increased without changing the size of the filter tank or the depth of the bed.

Note also that the filter media is gradually depleted requiring new media be added to the system periodically. This depletion occurs during filter bed rejuvenation and is accelerated when the filter media is being circulated vigorously as part of the slurry. This deletion results in a decrease in depth of the upper portion of the bed. However, the flow portions remain substantially equal because the portions are balanced by differences in back pressure within the bed portions.

A further improvement provided by this filtration system is the use of offset agitating nozzle sets to produce a spiral-like flow path of the slurry within the filter. This flow path promotes particulate-filter media separation and suspension so that the particulate may be effectively backwashed from the system. Upon reformation of the filter bed, the filter bed is insured of being in a clean condition.

Lastly, the cleaning receptacle purge circuit insures that the cleaning receptacle is free of particulate and thus in a fit condition. When the system is next adapted to its rejuvenation mode, rejuvenation can be effectively and timely accomplished. System efficiency is measured by the volume of waste water processed per a period of time. Therefore, this circuit helps to meet this objective of minimizing the time the system is in its rejuvenation mode and maximizing the time the system is in its filtration mode.

DESCRIPTION OF THE DRAWINGS

FIG. 1 is a schematic diagram of a filtration system of this invention.

FIG. 2 is an elevation cross-sectional view of a deep-bed type filter used in the system of FIG. 1.

FIG. 3 is a plan cross-sectional view of a typical arrangement of agitation nozzles usable with the filter of FIG. 2.

FIG. 4 is a plan cross-sectional view of the filter as generally seen along the line 4—4 of FIG. 2.

DESCRIPTION OF THE PREFERRED EMBODIMENT

A filtration system is shown generally in FIG. 1 and designated 10. A deep-bed type filter 12 used in the system 10 is shown in greater detail in FIGS. 2–4. The filter 12 has a hollow cylindrical-shaped middle body portion 14 and closed top and bottom dome-shaped end portions 16, 18 connecting therewith. The system 10 has two general modes of operation, a filtration mode and a rejuvenation mode.

In the filtration mode, a flow of a waste liquid, for example a particulate mixed with water, from a source S enters the filter 12 through an upper inlet 20 connected to the source S by a supply line 22. Control of this flow is provided by a first valve 24.

Within the filter 12 the inlet 20 connects with an internal inverted L-shaped inlet line 28. The inlet line 28 has a vertical leg portion 30 which is centrally located within the filter 12 and terminates at a lower open end 32. This open end 32 is located immediately above an inner surface 34 of the bottom end portion 18 of the filter 12.

The vertical leg portion 30 is surrounded by a distribution plenum 36. The plenum 36 comprises an enlarged circular lower portion 38. A bottom edge 40 of this lower portion 38 rests on the inner surface 34 of the filter bottom end portion 18 and forms a sealed fit with such. The enlarged circular portion 38 contains a series of perforations 42. An upper edge of the enlarged portion 38 is joined to an upper circular stack portion 44 by a conical-shaped converging portion 46. An inside diameter of the stack 44 is sufficiently larger than an outside diameter of the inlet line vertical leg 30 to provide a selective flow space 48 therebetween.

The number or size of the perforation 42 and the flow space 48 have been so chosen to allow a substantially equal distribution of the waste liquid entering the filter device 12 through the internal inlet line 28. Thus, a substantially equal volume of waste liquid flows through the perforations 42 and through an open upper end 50 of the upper stack 44 of the distribution plenum 36.

Surrounding the distribution plenum 36 is a deep-bed 52 of a granular filter media 54. The media 54 may be sand, coal, ground walnut shell, or other like material. The amount of the filter media 54 in the filter device 12 is such that a top surface 56 is located immediately below the upper open end 50 of the plenum stack 44.

To compensate for a gradual loss of the media 54 during operation of the system 10, a series of outlet conduits 58 are located slightly below a midpoint of the filter bed 52. As best seen in FIGS. 2 and 4, there are four such conduits 58 which are horizontally disposed and extend across a full width or diameter of the filter body portion 14. At the point where additional media 54 must be added to replace the depleted media noted above, the conduits 58 would be located at the proximate midpoint below the top surface 56 of the filter bed 52. Each conduit 58 comprises a spirally wound wedge wire with a pitch of the spiral chosen to provide spaces 64 between adjacent convolutions.

As the waste liquid discharges from the lower open end 32 of the internal inlet line 28, one portion flows through the perforations 42 in the plenum enlarged circular portion 38 and then upwardly through a lower portion 60 of the filter bed 52. A substantially equal volume of waste liquid flows upward within the flow space 48, out of the open upper end 50 of the stack 44, and then downward through an upper portion 62 of the filter bed 52.

During this upward and downward flow of the waste liquid through the filter bed portions 60, 62, the particulate within the waste liquid becomes entrapped within the interstices formed by the filter media 54. By the time the flow reaches the conduits 58, substantially all of the particulate is removed. The waste liquid now clarified flows through the spaces 64 and to an outlet 66 of each conduit 58. The spaces 64 in the conduits 58 are so dimensioned to prohibit passage of the filter media 54.

The conduit outlets 66 connect with a header 68. The header 68 in turn connects with a discharge line 70 allowing the clarified waste liquid to flow from the system 10 through a second valve 72.

The requirement for rejuvenation may be determined by sensing a pressure in the supply line 22. A certain increase in this pressure, for example from 5 psi to 25 psi, indicates that the filter bed 52 cannot practically process any further waste liquid because entrapped particulate therein is substantially impeding the flow.

To rejuvenate the filter bed 52, the first and second valves 24, 72 are closed which stops all flow to and from the system 10.

The system 10 then is adapted to its rejuvenation mode which utilizes a series of circuits. The first circuit is a slurry circuit which provides a closed loop flow path defined by an upper slurry outlet 84 in the filter 12. The outlet 84 is connected to an inlet 86 of a cleaning receptacle 88 through a slurry input line 90. The line 90 contains a third valve 92. The receptacle 88 in turn has a first lower slurry outlet 94 which is connected to an intake 96 of a scrubber pump 98 by a scrubber pump intake line 99. A discharge 100 of the pump 98 in turn is connected with an upper and lower set of agitation nozzles 102, 104 by a slurry outlet line 106. Flow to the set of nozzles 102, 104 is controlled by fourth, fifth, sixth and seventh valves 108, 110, 112 and 114 respectively.

As best seen in FIG. 3, the upper nozzle set 102 comprises two nozzles. The nozzles 102 are laterally offset on each side of a center of the filter 12 to produce a counterclockwise flow. The lower set of nozzles 104 are carried by the tank bottom end portion 18 and likewise are positioned in an offset manner on each side of the center of the filter 12. As positioned, the lower set of nozzles 104 also produces a counterclockwise flow.

With the valves 92, 108, 110, 112 and 114 open the scrubber pump 98 is energized to form a slurry of the waste liquid, the filter media 54 and entrapped particulate in the filter 12. This slurry is circulated at a rate of proximately 1000 gpm for about 15 minutes where the filter is 5 feet in diameter, for example. Larger filters use even greater flow rates. During this circulation, the action of the scrubber pump 98 as well as the spiral-like flow path created by the flow of the upper and lower nozzle sets 102, 104 in the filter 12 separates the particulate from the filter media 54 such that each is independently suspended within the waste liquid of the slurry.

With this particulate-filter media separation complete, use of the slurry circuit is discontinued and replaced by use of a backwash circuit. This circuit includes an eighth valve 116 which is opened and connected to a second slurry outlet 118 of the cleaning receptacle 88 by a backwash discharge line 117. With the eighth valve 116 open, waste liquid and particulate discharge through a separator 120 carried within the receptacle 88. This separator 120 may be similar in construction to the conduits 58 and comprises a wound wedge wire tube wherein the wedge wire convolutions are spaced to prohibit passage of the filter media 54 while allowing a flow of the particulate and waste liquid. Concurrently with the opening of the eighth valve 116, the first valve 24 is also opened to allow an inflow of the waste liquid to replace the outflow from the cleaning receptacle 88. Also valves 110, 114 are closed which reduces the flow rate through the still energized scrubber pump 98 to proximately one-half of the flow rate of the slurry circuit. Within a short period of time the concentration of particulate in the slurry is reduced to a concentration substantially equal to that in the source S.

With this concentration of particulate in the slurry so reduced, use of the backwash circuit is terminated. The rejuvenation mode then is adapted to use a filter bed reformation and purge circuit. This circuit includes a (3) dividing said discharged waste liquid into substantially equal first and second portions with a distribution plenum carried by said filter and located about said discharge point, (4) flowing said first waste liquid portion through perforations provided in a lower portion of said plenum, (5) flowing said second waste liquid portion through an open end provided in an upper portion of said plenum, (6) flowing said first waste liquid portion from said perforations upwardly through filter media comprising a lower portion of a filter bed in said filter, (7) flowing said second waste liquid portion from said open end downwardly through filter media comprising an upper portion of said filter bed, (8) entrapping particulate in said waste liquid during said flow through said filter bed portions, and (9) discharging said waste liquid in a clarified condition through conduits centrally located within said bed, said filtration system further characterized by having a rejuvenation mode, a method of operating said rejuvenation mode comprising the steps of:

(1) discontinuing said inflow and said discharge from said system, (2) deforming said filter bed with a slurry circuit defined in part by a scrubber pump having an intake connected to a slurry discharge outlet of said filter by a slurry input line, (3) separating said particulate from said filter media and suspending each in said waste liquid of said slurry by flowing said slurry into said filter with nozzle sets carried by said filter to create a spiral-like circulating flow path of said slurry within said filter, said nozzle sets connected to a discharge of said scrubber pump by a slurry outlet line (4) backwashing said waste liquid and said particulate from said system with a backwash circuit defined in part by a cleaning receptacle having an inlet connected into said slurry input line and a second outlet to a drain line, (5) reforming and purging said filter bed with a reformation and purge circuit defined in part by a media return line connecting said discharge of said scrubber pump to said filter inlet and a filter purge line connecting said filter discharge conduits to said intake of said scrubber pump, and (6) purging said cleaning receptacle with a cleaning receptacle purge circuit defined in part by a purge line connecting said supply line to said second cleaning receptacle outlet and a by-pass line connecting said cleaning receptacle inlet to said filter inlet.

3. In a filtration system including a deep-bed type filter for separating particulate from a liquid flow, said filter defined by an enclosed hollow body filled in part by a filter media forming said bed, the improvement therein comprising, an inlet carried by said filter body with said inlet having an open end located in a lower inner portion of said filter body, a distribution plenum formed about and spaced from said inlet open end and having an upper and lower open discharge area, said filter bed formed about said plenum to receive said liquid flow from said plenum open areas and entrap said particulate, conduit means having spaces to receive said liquid flow and inhibit passage of said filter media, said means located proximately midway between said upper and lower discharge areas of said plenum, and rejuvenation means connected to said filter body to periodically remove said entrapped particulate from said filter bed, said filtration system further characterized by said distribution plenum comprising, a lower circular perforated portion having a plurality of openings sized to readily allow passage of said filter media, a converging portion joining a top of said lower perforated portion, and an upper stack connected to a top of said converging portion, said stack positioned about a vertical leg of said inlet to form a flow space therebetween, a top end of said stack forming said distribution plenum upper discharge area with said top end located above said filter bed.

4. A filtration system as defined by claim 3 and further characterized by said rejuvenation means comprising, an upper and lower set of agitating nozzles carried by said filter body to project within said body, said lower set being offset to produce a rotational flow in said body, and said upper set being offset to produce a like rotational flow in said body, wherein during activation of said rejuvenation means said nozzles receive a liquid slurry to create a spiral-like circulating flow path of said slurry in said filter body to separate said filter media and said particulate entrapped in said bed.

5. In a filtration system for separating particulate mixed with a liquid wherein said system may receive batches of said particulate-liquid mixture, said system including, a filter tank having an upper inlet for connection to a source of said particulate-liquid mixture, said inlet having a vertical leg centrally located within said tank to provide a discharge of said particulate-liquid mixture through an open end located in a bottom portion of said tank, a bi-flow distribution plenum positioned freely about said vertical inlet leg to form a flow space therebetween, said plenum having a perforated lower portion and an open upper end to provide for upper and lower release of said mixture in proximately equal volumes, a filter bed of a granular filter media disposed in said tank and about said plenum for entrapping said particulate in said mixture, and a set of wedge wire type conduits carried by said tank and extending horizontally into a middle portion of said filter bed to receive a downward and upward flow of said liquid from said upper and lower plenum release of said mixture respectively, each said conduit comprising a spiral wedge wire tube having convolutions of wedge wire selectively spaced to prohibit a passage of said filter media, wherein said particulate-liquid mixture may enter said filter tank through said inlet, be discharged into said distribution plenum for said upper and lower release into said filter bed, said filter bed entrapping said particulate so that only said liquid flows from said filter tank through said wedge wire conduits.

purge line 122 which connects the second cleaning receptacle outlet 118 with the source of waste liquid S through a ninth valve 124. The valve 124 is opened while valves 24, 92, 108, 110, 112, 114 and 116 are closed. The purge circuit additionally includes a filter purge line 126 containing a tenth valve 128 which is opened. This line 126 connects with the slurry inlet line 90 between the cleaning receptacle inlet 86 and the third valve 92 and with the discharge line 70. This circuit lastly includes a filter media return line 130 containing an eleventh valve 132 which is opened. This return line 130 connects the discharge 100 of the scrubber pump 98 with the supply line 22 between the first valve 24 and the filter inlet 20.

Because the ninth valve 124 is open, this circuit remains pressurized while the scrubber pump 98 continues to operate. The filter media 54 in the slurry input line 90 and the cleaning receptacle 88, for example, is drawn into the scrubber pump 98 and from there pumped through the eleventh valve 132 and into the filter 12. Because the tenth valve 128 is also open, the waste liquid portion of the slurry is drawn by the scrubber pump 98 through the conduits 58 which at the same time prohibits passage of the filter media 54. In this manner the filter media 54 is returned to the filter 12 whereupon the filter bed 52 is reformed. Note that the perforations 42 in the distribution plenum 36 are sufficiently large to allow passage of the filter media 54 during this reformation. The location of the lower open end 32 of the inlet pipe 28 contributes to the passage of the filter media 54 from the plenum lower portion 38 to promote this bed reformation.

With this reformation, the filter bed 52 commences its filtering function such that the particulate in the slurry is removed to produce substantially clean liquid in the purge and filter bed reformation circuit. This insures that only clean liquid is discharged when the system 10 returns to its filtration mode since the discharge line 70 is used as part of this purge circuit and is used during the system filtration mode.

With the filter bed 52 reformed and functioning, the use of filter bed reformation and purge circuit is terminated. The rejuvenation mode is next adapted to use a cleaning receptacle purge circuit. This circuit requires a by-pass line 134 containing a twelfth valve 136 placed in open condition. This line 134 has one end which connects with supply line 22 between the first valve 24 and the connection of the supply line 22 with the filter media return line 130. A second end of the by-pass line 134 connects with the slurry input line 90 between the third valve 92 and the connection of the slurry input line 90 with the filter purge line 126. The second and ninth valves 72, 124 are opened with the remainder of the valves 24, 92, 108, 110, 112, 114, 116, 128 and 132 closed and the scrubber pump 98 de-energized.

Waste liquid enters the system 10 through the purge line 122 and flows in a reverse direction through the separator 120 in the cleaning receptacle 88 to clean the separator 120. Any dislodged particulate and filter media 54 then flows out of the receptacle inlet 86, through the by-pass line 134 and the twelfth valve 136, and into the filter 12. The dislodged particulate is entrapped by the filter bed 52, and the liquid is discharged from the system 10 through the second valve 72.

With the cleaning receptacle 88 properly purged, use of this purge circuit is terminated. The system may then be returned to its filtration mode by opening the first valve 24 and closing the ninth and twelfth valves 124, 136.

It should be pointed out that the filter bed 52 may be rejuvenated by backwashing such in situ wherein a gentle stream of a backwash liquid flows through the bed 52 in a reverse direction. This reverse flow slightly expands the bed 52 to allow the entrapped particulate to be washed from the filter media 54. The type of filter media incorporated to a great extent controls the type of rejuvenation usable. A sand media, for example, must be rejuvenated in situ because of its more fragil physical characteristics.

While various modifications may be suggested by those versed in the art, it should be understood that I wish to embody within the scope of the patent warranted hereon all such modifications as reasonably and properly come within the scope of my contribution to the art.

What is claimed is:

1. In a filtering system having a filtration mode and a rejuvenation mode, a method of operating said filtration mode comprising the steps of:
    (1) delivering a waste liquid in a supply line to an inlet of a deep-bed type filter connected to said supply line,
    (2) flowing said waste liquid from said inlet to a lower discharge point within said filter,
    (3) dividing said discharged waste liquid into substantially equal first and second portions with a distribution plenum carried by said filter and located about said discharge point,
    (4) flowing said first waste liquid portion outwardly through perforations provided in a lower part of said plenum,
    (5) flowing said second waste liquid portion through an open end provided in an upper portion of said plenum,
    (6) flowing said first waste liquid portion from said perforations upwardly through generally uniform sized filter media comprising a lower portion of a filter bed surrounding said plenum lower part in said filter,
    (7) flowing said second waste liquid portion from said open end downwardly through said filter media comprising an upper portion of said filter bed,
    (8) entrapping particulate in said waste liquid during said flow through said filter bed portions,
    (9) discharging said waste liquid in a clarified condition through conduits centrally located within said bed, and a method of operating said rejuvenation mode comprising the step of;
    (1) rejuvenating said filtering system by flowing a backwash liquid slurry upward through said filter bed to fully expand said bed with said particulate, said filter media, and said slurry flowing upward in part within said plenum and with said slurry and said particulate discharging through a backwash outlet carried in an upper part of said filter.

2. In a filtering system having a filtration mode, a method of operating said filtration mode comprising the steps of:
    (1) delivering a waste liquid in a supply line to an inlet of a deep-bed type filter connected to said supply line,
    (2) flowing said waste liquid from said inlet to a lower discharge point within said filter, 6. A filter system as defined by claim 4 and further characterized by, said filter tank inlet connected to said source of particulate-liquid mixture by a supply line containing a first valve and said wedge wire conduit connected to a discharge line by a header with said discharge line containing a second valve, wherein a filtration mode of said system may be controlled by a selective opening and closing of said first and second valves.

7. A filter system as defined by claim 6 and further characterized by said system including, slurry circuit means for deforming said filter bed and separating said entrapped particulate from said filter media, said means including a scrubber pump having an intake connected to a slurry outlet carried in said filter tank by a slurry input line and a discharge connected to sets of agitating nozzle means carried in said filter tank by a slurry output line, backwash circuit means for draining said separated particulate from said system, said means including a cleaning receptacle having an inlet connected to said filter tank slurry outlet by said slurry input line, a first outlet connected to said scrubber pump intake by a scrubber pump intake line, and a second outlet connecting an internal separator means within said receptacle with a backwash discharge line, filter bed reformation and purge circuit means for reforming said filter bed and producing a clean discharge therefrom, said means including a purge line connecting said supply line to said scrubber pump intake, a media return line connecting said scrubber pump discharge to said filter tank inlet, and a filter purge line connecting said discharge header to said scrubber pump intake, and cleaning receptacle circuit means to clean said separator in said receptacle, said means including a bypass line connecting said cleaning receptacle inlet to said filter tank inlet, wherein said circuit means may be selectively used to rejuvenate said filter bed so that said system may be returned to its filtration mode.

8. A filter device having a tank to receive a foreign matter-liquid flow and retain said foreign matter to allow said liquid to flow from said tank in a clarified condition, said device further comprising, a distribution plenum carried within said tank, said plenum having a top open end and a lower open end provided by a series of perforation-like openings formed therein, a bed of generally uniform sized granular filter media located about said distribution plenum, said bed having a top surface located proximate said top open end of said distribution plenum and a lower portion of said bed located about said plenum lower open end, said filter media sized to form interstices to entrap said foreign matter and sized to pass freely through said plenum perforation-like openings, an inlet for said foreign material-liquid flow, said inlet carried by said tank and having an open end located within said plenum perforation-like openings, and a discharge conduit for said clarified liquid flow discharge, said conduit carried by said tank and located in a middle portion of said filter bed with said conduit having a permeable surface to allow passage of said liquid while inhibiting passage of said filter media.

* * * * *